(12) United States Patent
Shroff et al.

(10) Patent No.: US 8,301,511 B2
(45) Date of Patent: *Oct. 30, 2012

(54) BUYER-INITIATED SHIPPING SYSTEM

(75) Inventors: Sumeet Shroff, Atlanta, GA (US);
Nagesh Kadaba, Roswell, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/204,878

(22) Filed: Aug. 8, 2011

(65) Prior Publication Data

US 2011/0289014 A1 Nov. 24, 2011

Related U.S. Application Data

(63) Continuation of application No. 12/627,297, filed on Nov. 30, 2009, now Pat. No. 8,027,882, and a continuation of application No. 11/066,404, filed on Feb. 25, 2005, now Pat. No. 7,647,249.

(51) Int. Cl.
*G06Q 30/00* (2012.01)
(52) U.S. Cl. .............. 705/26.42; 705/26.1; 705/26.41; 705/330; 705/334; 705/336; 705/337
(58) Field of Classification Search ........ 705/26.1–27.2, 705/330–338
See application file for complete search history.

(56) References Cited

U.S. PATENT DOCUMENTS

| | | | |
|---|---|---|---|
| 4,846,359 A | 7/1989 | Baird et al. | |
| 6,006,200 A | 12/1999 | Boies et al. | |
| 6,684,980 B2 | 2/2004 | Hungerford, III | |
| 7,069,236 B1 | 6/2006 | Tsunenari | |
| 7,076,449 B2 | 7/2006 | Tsunenari et al. | |
| 7,647,249 B2 | 1/2010 | Shroff et al. | |
| 2002/0013744 A1 | 1/2002 | Tsunenari et al. | |
| 2002/0133434 A1 | 9/2002 | Nevel et al. | |
| 2002/0138356 A1 | 9/2002 | Dutta et al. | |
| 2003/0208411 A1 | 11/2003 | Estes et al. | |
| 2003/0220887 A1 | 11/2003 | Stickler et al. | |
| 2004/0002903 A1 | 1/2004 | Stolfo et al. | |
| 2004/0212833 A1 | 10/2004 | Taskett et al. | |
| 2005/0038758 A1 | 2/2005 | Hilbush et al. | |
| 2005/0114222 A1 | 5/2005 | Mundy | |
| 2005/0216298 A1 | 9/2005 | Kincaid | |
| 2006/0100970 A1 | 5/2006 | Morony et al. | |

OTHER PUBLICATIONS

Standard Guidelines for Consignee; dated Oct. 17, 2005.
Print Shipping Labels with eBay's Online Postage; Origin: www.ebay.com.
European Extended Search Report dated Aug. 31, 2009, European Patent Application No. 06735803.6; PCT/US2006006293.
XP002456252—Statement in Accordance with the Notice from European Patent Office dated Oct. 1, 2007 concerning business methods; OJ EPO; Nov. 2007; pp. 592-593.
International Searching Authority; The International Search Report and The Written Opinion on PCT/US 06/06293; mailed Aug. 9, 2007.
ProQuest; Scan-tech: The "shoulda" show, Moore, Bert, Material Handling Engineering, Cleveland: Dec. 1998, vol. 53, Iss. 13, pp. 1-3.

*Primary Examiner* — William Allen
(74) *Attorney, Agent, or Firm* — Alston & Bird LLP

(57) ABSTRACT

A system and method in which a buyer registers for a buyer's shipping account and uses the shipping account to pay shipping costs associated with purchases made over the Internet. When a buyer purchases merchandise over the Internet from either a retailer's website or from an individual through an online auction, the buyer is capable of controlling the shipping process by logging on to their buyer's shipping account. Among other things, the buyer can use their shipping account to select the desired type of shipping service (overnight air or ground) and populate a shipping label with shipping information such as delivery address, return address, and preferred delivery time windows. Once the shipping label has been populated and verified, the shipping label is electronically transferred to the seller for use in shipping the package. The system and methods of the present invention allow the buyer greater control over the shipping process. In many cases, the present invention will also help buyers/receivers control costs by eliminating the shipper's shipping and handling fee.

22 Claims, 10 Drawing Sheets

BUYER-INITIATED SHIPPING SYSTEM

CROSS-REFERENCE TO RELATED APPLICATIONS

This application is a continuation of U.S. patent application Ser. No. 12/627,297, filed on Nov. 30, 2009 and now issued U.S. Pat. No. 8,027,882, and U.S. patent application Ser. No. 11/066,404, filed on Feb. 25, 2005 and now issued U.S. Pat. No. 7,647,249, the contents of both of which applications are hereby incorporated herein by reference in their entirety.

FIELD OF THE INVENTION

The present invention relates generally to buyer-initiated shipping systems, and, more particularly, to systems designed to allow users to purchase and facilitate the creation of a shipping label used by a shipping service provider in connection with the delivery of goods purchased over the Internet or other suitably networked or organized system.

BACKGROUND OF THE INVENTION

The age of the marketplace, where merchants and consumers meet in a centralized location and conduct commerce face-to-face, is slowly becoming a thing of the past. In today's global economy, business is more frequently being conducted using telephones, fax machines, and the Internet. In recent years, use of the Internet as a means for purchasing consumer goods has increased exponentially. Comprehending the magnitude of the Internet on the U.S. economy is most easily summed up by providing a snapshot of recent Internet sales figures. For example, $100 billion was spent on e-commerce in the United States during 2003. The fourth quarter of 2004 alone is expected to produce $22.34 billion in online sales. Online purchases of apparel and accessories will reach $7.5 billion in 2004. In 2003, 30% of all catalog purchases took place on the Web. Most U.S. companies, understanding the Internet's far reaching potential, now offer websites in which consumers can purchase merchandise and have it delivered right to their front door step. In fact, the vast majority of U.S. retailers are currently selling their products online.

The explosion of on-line commerce is not limited to traditional merchants such as Sears and Wal-Mart. Companies such as eBay, which operates online auctions, among other services, provide anybody with a computer or other suitable equipment with the ability to become an online retailer. Online auctions allow entities across the globe to bid on thousands upon thousands of goods. No matter what one is looking for, there is a good chance it will be up for bid on eBay or some other online auction site.

Although consumers rave about the advantages of shopping online, many would be quick to point out the negative aspects as well. For example, one major drawback of Internet shopping is the waiting period between the time merchandise is purchased and the time it is delivered. During peak holiday seasons, the backlog on orders can be phenomenal. Even if an order is not backlogged, long waits often occur because of inefficient order processing or mislabeling of packages.

Another drawback in the use of such systems relates to shipping and handling fees. When consumers purchase goods over the Internet, shipping costs, especially when solely selected by the seller, can be quite high. In some cases, the shipping fees can actually exceed the price of the good itself. However, the reality of such commerce is that the transacting parties will rarely be within driving distance of one another. As a result, consumers and merchants alike have come to rely heavily on shipping providers such as UPS to deliver their online purchases.

A buyer's lack of control represents another problem facing on-line shoppers. Currently, when merchandise is purchased through eBay or any other retailer, it is the seller that controls shipping. The seller generally bears the responsibility of selecting the means of delivery and paying the delivery fees. The role of the buyer in such prior art situations is much more passive, generally amounting to the reimbursement of shipping and handling fees. About the only way for the customer to reduce shipping costs is to request that the seller use a less expensive shipping service. For example, the choice could be to have the goods shipped using ground delivery, as opposed to air delivery. Even after selecting a specific shipping service and paying the shipping fees, the customer still has to rely on the seller to put the correct address on the shipping label. Shipping delays are often caused by incorrectly populated shipping labels.

Although it makes some sense for the seller to control shipping to a certain extent, due to the seller's possession of the goods, there is a need in the art for a system that provides the buyer with more control over the shipping process. Therefore, an unsatisfied need exists in the art for improved methods and systems for providing buyers with greater control over the process for shipping goods sold to them that overcomes the deficiencies in the prior art, some of which are discussed above.

BRIEF SUMMARY OF THE INVENTION

Various embodiments of the present invention seek to provide systems and methods that allow buyers greater control over the shipping costs associated with the delivery of goods purchased over the Internet. In addition, particular embodiments of the present invention provide increased reliability with regard to the delivery of goods purchased over the Internet.

According to various embodiments, this object is achieved by providing shipping systems and methods accessible by a buyer's computer through a computer network (wired or wireless), such as the Internet. One aspect of the shipping systems and methods allows the buyer to register and subscribe to a personalized buyer's shipping account. Another aspect of the shipping systems and methods allows a buyer, who purchases goods from a seller over the Internet, to access his or her shipping account to create and purchase a shipping label that can subsequently be used by the seller in the delivery of the goods purchased over the Internet.

Generally described, one aspect of various embodiments of the present invention provide systems and methods in which a buyer can create and purchase a shipping label from a shipping service provider for use by a seller in connection with delivery of goods purchased over the Internet from the seller. Registration information is received from the buyer that includes data specifying registration of the buyer for a shipping account with the shipping service provider. In turn, the shipping account is created in which the buyer can arrange for direct payment of shipping services with the shipping service provider.

Thus, in particular embodiments, shipping information may be received from the buyer accessing the shipping account. The information is associated with a transaction with a seller and includes information to facilitate, at least in part, shipment of goods from the seller to the buyer. In response, a file may be created containing a pre-populated shipping label. In various embodiments, the pre-populated shipping label may include the buyer's physical delivery address and preferred delivery time windows. Once the file is created, the file may be transferred to the seller so that the seller may use the shipping label to facilitate shipment of the goods to the buyer via the shipping service provider.

In particular embodiments, the buyer is allowed to purchase one or more buying plans using his or her buyer's shipping account. After purchasing one or more buying plans, the buyer can purchase the shipping label using shipping credits that are included within the one or more buying plans. In particular embodiments, the systems and methods may be configured to determine the number of shipping credits required to purchase the shipping label based on the data input used to create the shipping label and to update the number of credits available on the buying plan. Further, in particular embodiments, the file containing the shipping label may be transferred to the seller via an electronic mail message. In other embodiments, the file containing the shipping label may be transferred to the seller via a link displayed on a website.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 9A:
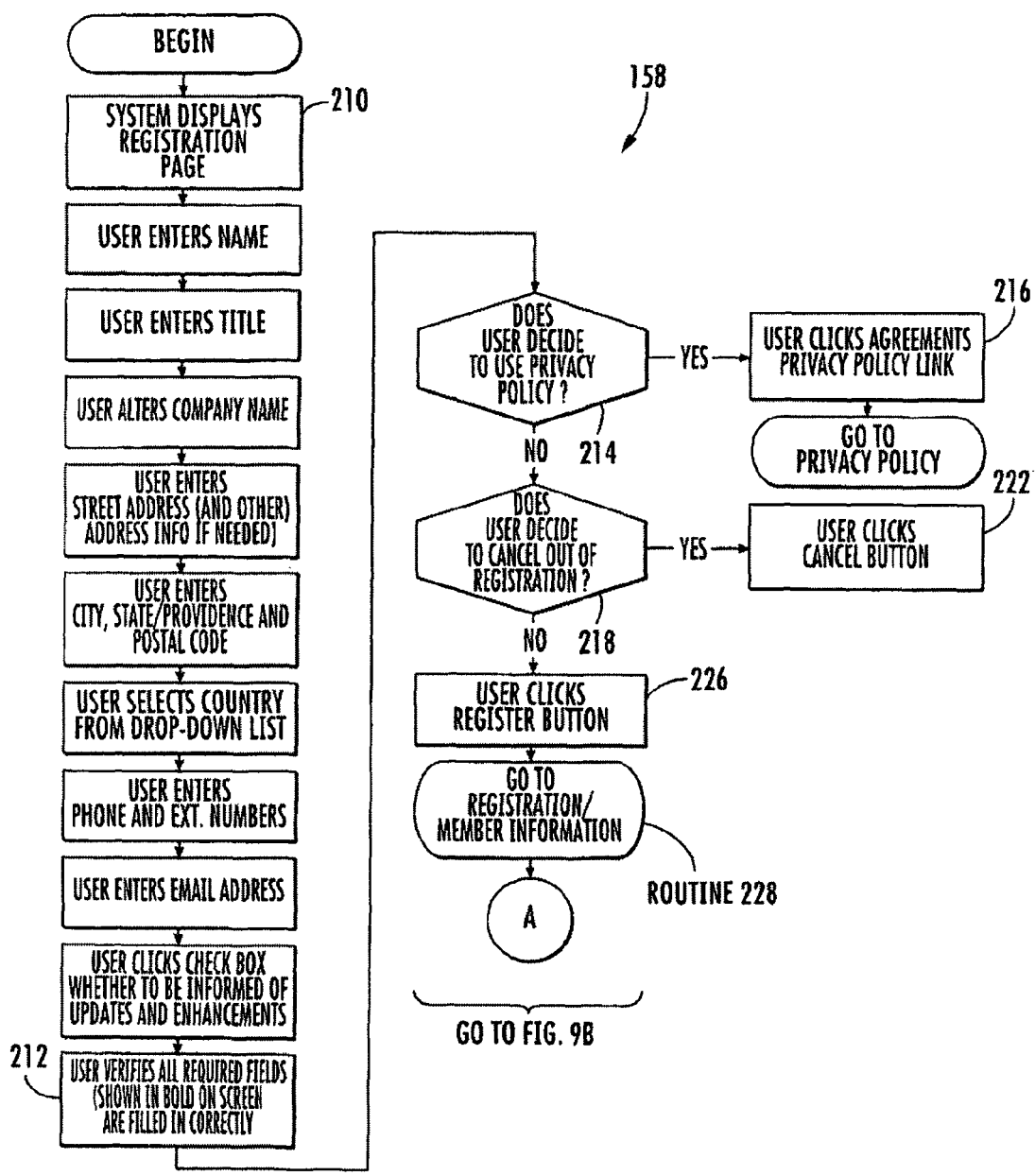
Figure 9B:
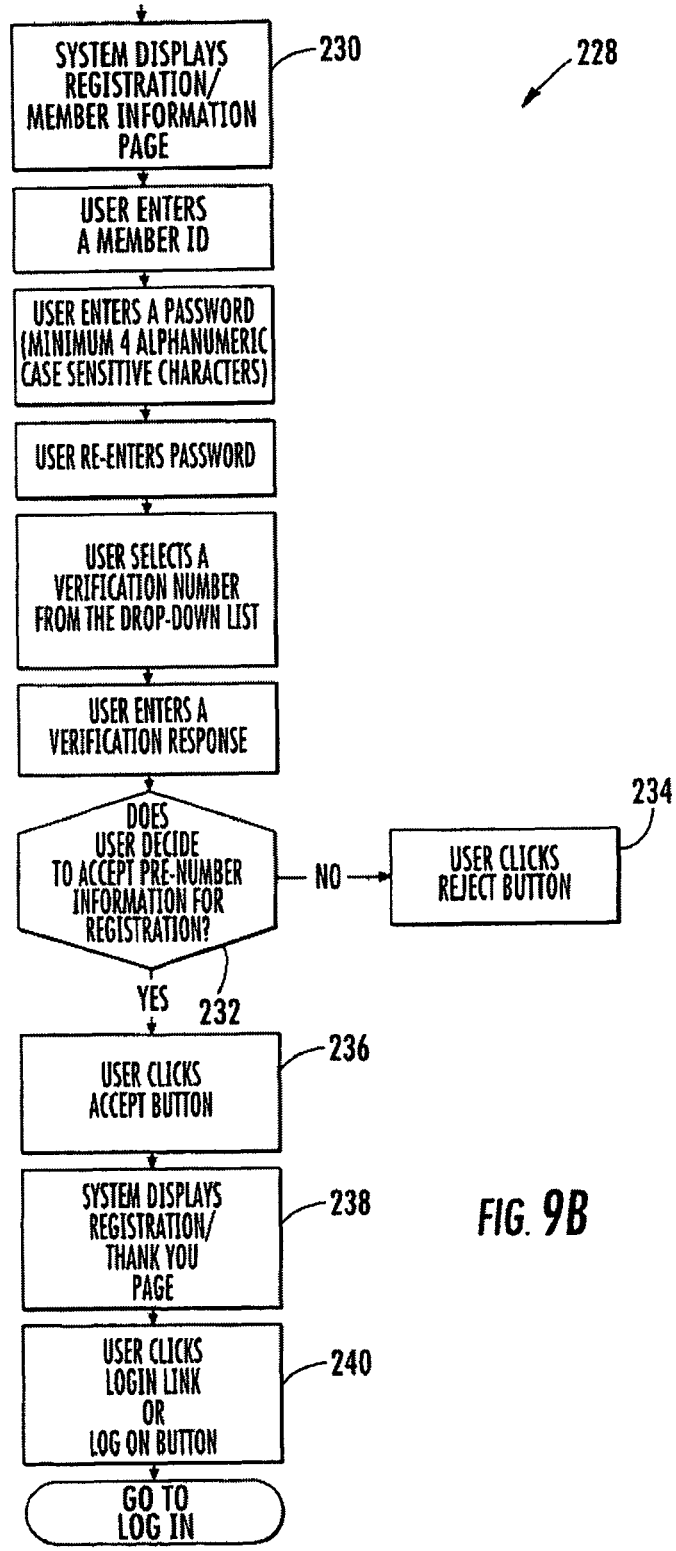

FIG. 9, consisting of FIGS. 9A and 9B, is a flow chart of a REGISTRATION routine employed in a preferred embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended exemplary inventive concepts. Although specific terms are employed herein, they are used in a generic and descriptive sense only and not for purposes of limitation.

Generally described, the present invention gives customers who make multiple online purchases the ability to leverage their buying power to receive discounts on shipping costs and to provide consumers with greater control and flexibility over shipping costs. Such control and flexibility is accomplished by the buyer 10 subscribing to a buyers shipping account and in some embodiments, purchasing one or more flexible buying plans 28 ("buying plans"). A typical buying plan 28 provides the seller with a fixed amount of monthly shipping "credits," which are redeemable to cover the cost of shipping fees. Instead of letting the seller make delivery arrangements, the buyer 10 will use their buyers shipping account, accessible through a link or window on the seller's webpage, to create a shipping label. Once created, the shipping label will be transferred to the seller. In turn, the seller will attach the label to the package and transfer the package to a shipping service provider such as UPS.

Buyer-Initiated Shipping Systems
Overview

Figure 1:
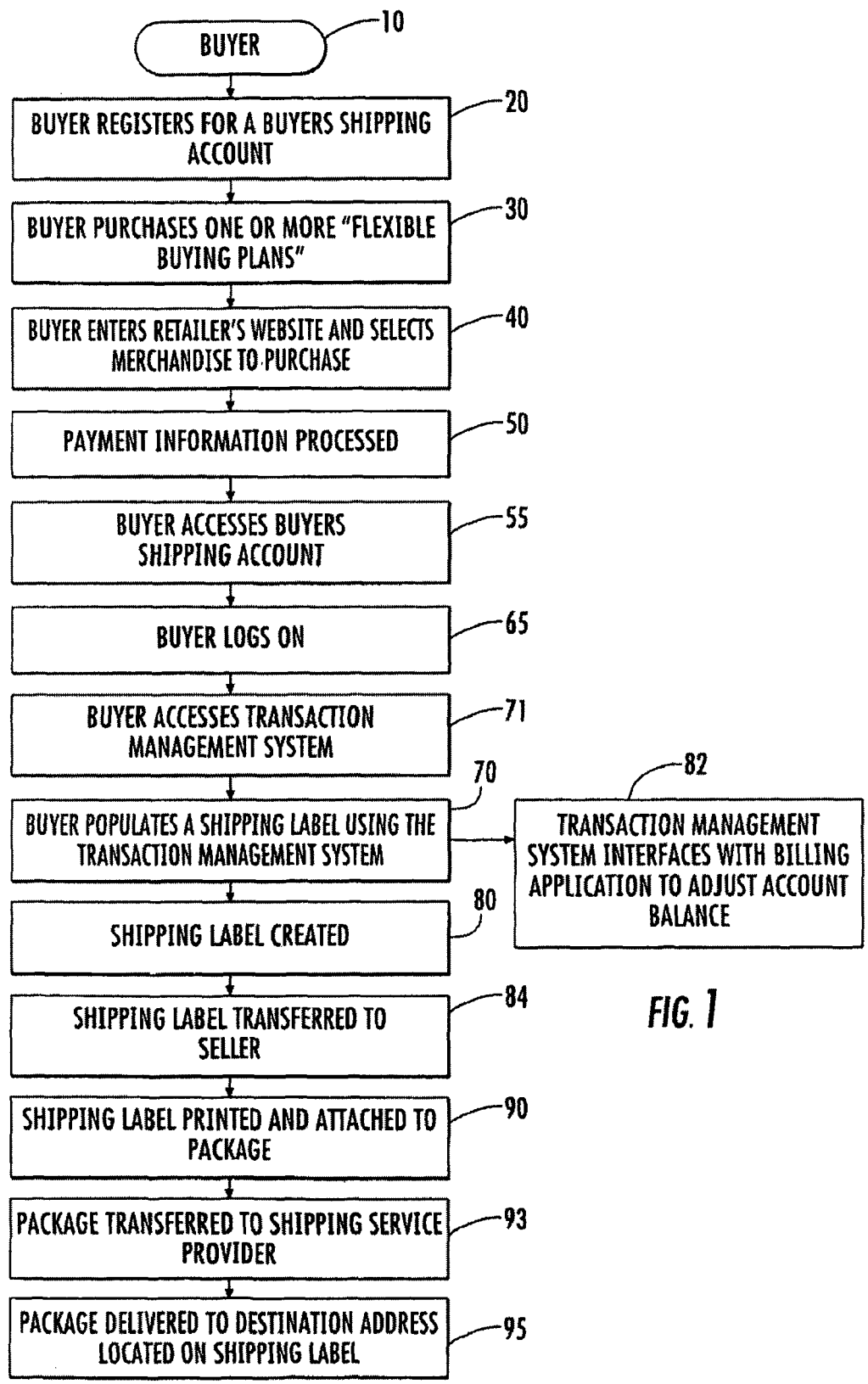
FIG. 1 shows a process flow diagram illustrating the steps in accordance with an embodiment of the present invention in which a buyer purchases an item from a retailer's website.

With the foregoing description in mind, turn now to FIG. 1 for a discussion of the various computer-implemented processes for carrying out the methods of the preferred embodiments of the present invention. Although the preferred embodiments are generally described with reference to an Internet accessible personal computer (PC) operated by a buyer and Internet web site's operated by shipping service providers, retailers, and online auctioneers, those skilled in the art will recognize that the present invention can also be implemented in conjunction with other program modules for other types of computers.

Furthermore, those skilled in the art will recognize that the present invention is preferably implemented in a distributed or networked computing environment such as the Internet. In a distributed or networked computing environment like the Internet, program modules may be physically located in different local and remote memory storage devices. Execution of the program modules may occur locally in a stand-alone manner or remotely in a client/server manner. By way of illustration and not limitation, distributed computing environments include local area networks (LAN) of an office, enterprise-wide area networks (WAN), and the global Internet (wired or wireless connections). Accordingly, it will be understood that the terms computer, operating system, and application program include all types of computers and the program modules designed to be implemented by the computers.

The discussion of methods which follows is represented largely in terms of processes and symbolic representations of operations by conventional computer components, including a central processing unit (CPU), memory storage devices for the CPU, connected display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the CPU via a communication network.

The processes and operations performed by the computer include the manipulation of signals by a CPU, or remote server such as an Internet web site, and the maintenance of these signals within data structures reside in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is understood to include a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, and altering which are often associated with manual operations performed by a human operator. The operations described herein include machine operations performed in conjunction with various input provided by a human operator or user that interacts with the computer.

In addition, it will be understood that the programs, processes, routines and methods described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

With the foregoing in mind, FIG. 1 shows a process flow diagram illustrating various functions, processes, or routines carried out by a preferred embodiment of the present invention in which the buyer 10 makes an online purchase on a retailer's website. FIG. 1 illustrates these functions in a typical order of execution. The functions or processes in this figure are carried out in the disclosed embodiment of the present invention by software executing on a shipping service provider's server and the retailer's server, all of which are in conjunction with a browser computer program executing on a buyer's computer, when each are connected to the Internet and in communication with each other. It will be understood that the processes and methods presented here may be arranged differently. In other words, some processes and methods may be deleted, repeated or blended to form similar processes and methods.

At Step 20, the buyer 10 registers with a shipping service provider (a.k.a "SSP"), such as UPS, to set up a buyers shipping account. In order to set up the account, under one embodiment, the buyer can log onto the SSP's webpage, for example, www.ups.com. Once the buyer accesses the SSP's website, they begin the registration process by clicking on a link (not shown) that will begin the execution of a REGISTRATION routine. The REGISTRATION routine is described below in greater detail with reference to FIGS. 9A and 9B. Each account is identified by a preferably unique account number and stores shipping data such as the buyer's name, address, preferred delivery timeframes, special handling instructions, and any other relevant shipping information.

Once a buyer's shipping account has been established, Step 30 illustrates the buyer 10 purchasing one or more flexible buying plans 28. These buying plans can come in multiple embodiments and the exemplary embodiments that follow do not represent an exhaustive list. In one embodiment, the buyer 10 purchases a fixed amount of monthly shipping "credits", which as described in greater detail below will be used to purchase shipping services. Because each buyer's 10 shipping needs will vary, the buyer 10 could have the option of choosing between plans of varying expense. For example, the SSP could offer plans costing $50 a month, $100 a month, or $200 a month. For illustrative purposes only, the $50 a month plan could buy 50 shipping credits, the $100 a month plan could buy 125 shipping credits and the $200 a month plan could buy 300 shipping credits. As shown above, the buyer receives the greatest value when purchasing the more expensive plans. Therefore, buyers 10 who purchase and receive a large quantity of shipments will be able to harness their buying power to arrange the best possible shipping rates and volume discounts. With regards to the fixed-credit per month plans described above, some embodiments will allow the buyer to roll over any unused shipping credits from month to month. In other embodiments, any unused credits will be lost.

In another embodiment of a flexible buying plan, the credits will not be purchased on a monthly basis. Instead, the buyer 10 will simply purchase a fixed amount of credits for a one-time fee. For example, the buyer 10 could purchase 100 credits for $100. In yet another embodiment, the flexible buying plan would be structured to allow for unlimited shipping per month. Under some embodiments, the unlimited shipping per month plans would include certain constraints. For example, in one embodiment, the plan would cost $300 dollars a month and would allow the buyer 10 to receive unlimited shipments. However, only domestic shipping of packages weighing less than fifty pounds would be covered by the plan. In yet another illustrative embodiment, the plan could cost $200 dollars a month and the buyer 10 would receive unlimited shipping for both international and domestic shipping so long as the packages weigh less than two pounds.

Figure 4:
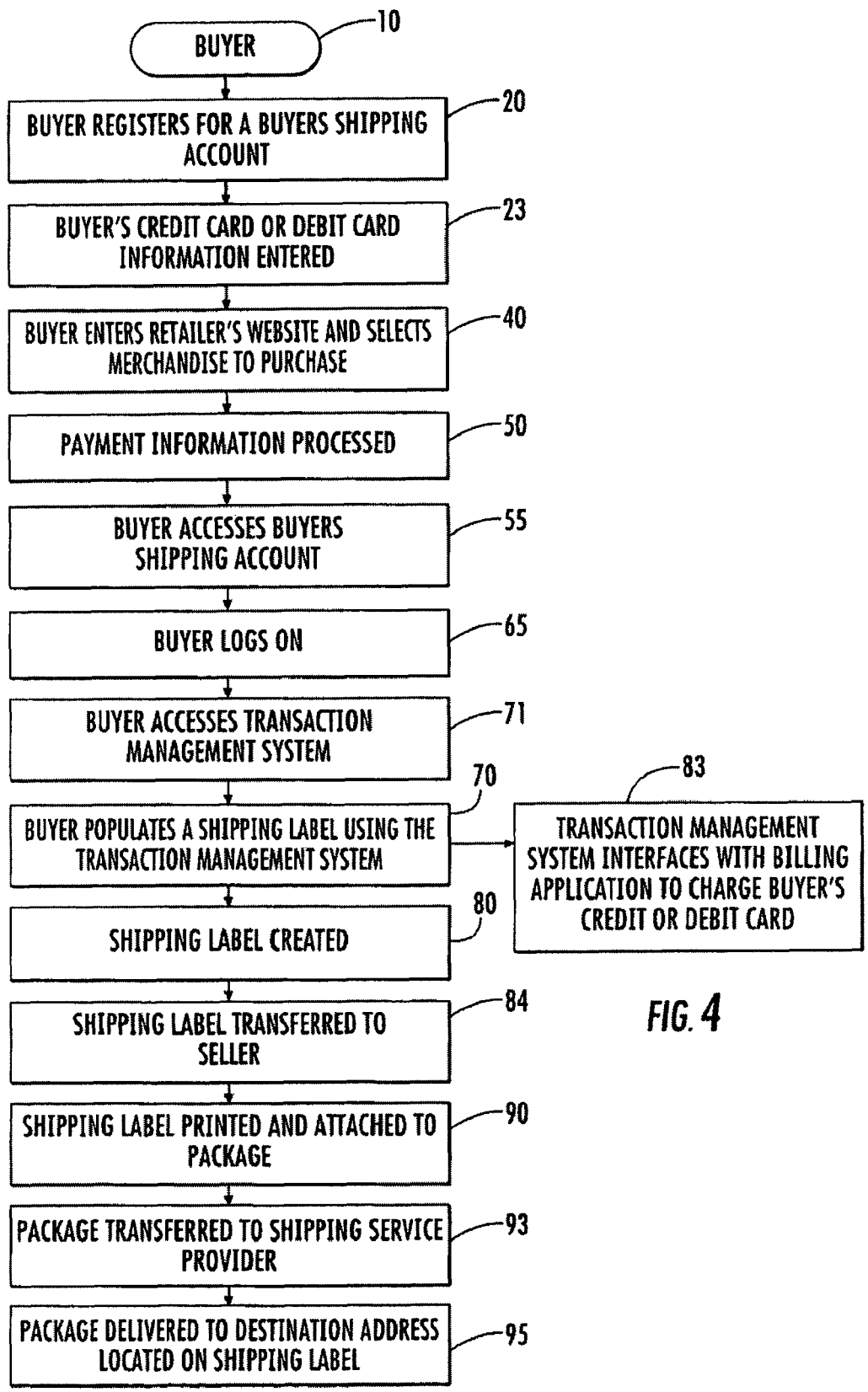
FIG. 4 shows the process flow diagram illustrated in FIG. 1 wherein the buyer pays for shipping services using a credit or debit card, as opposed to a prepaid buying plan.
Figure 5:
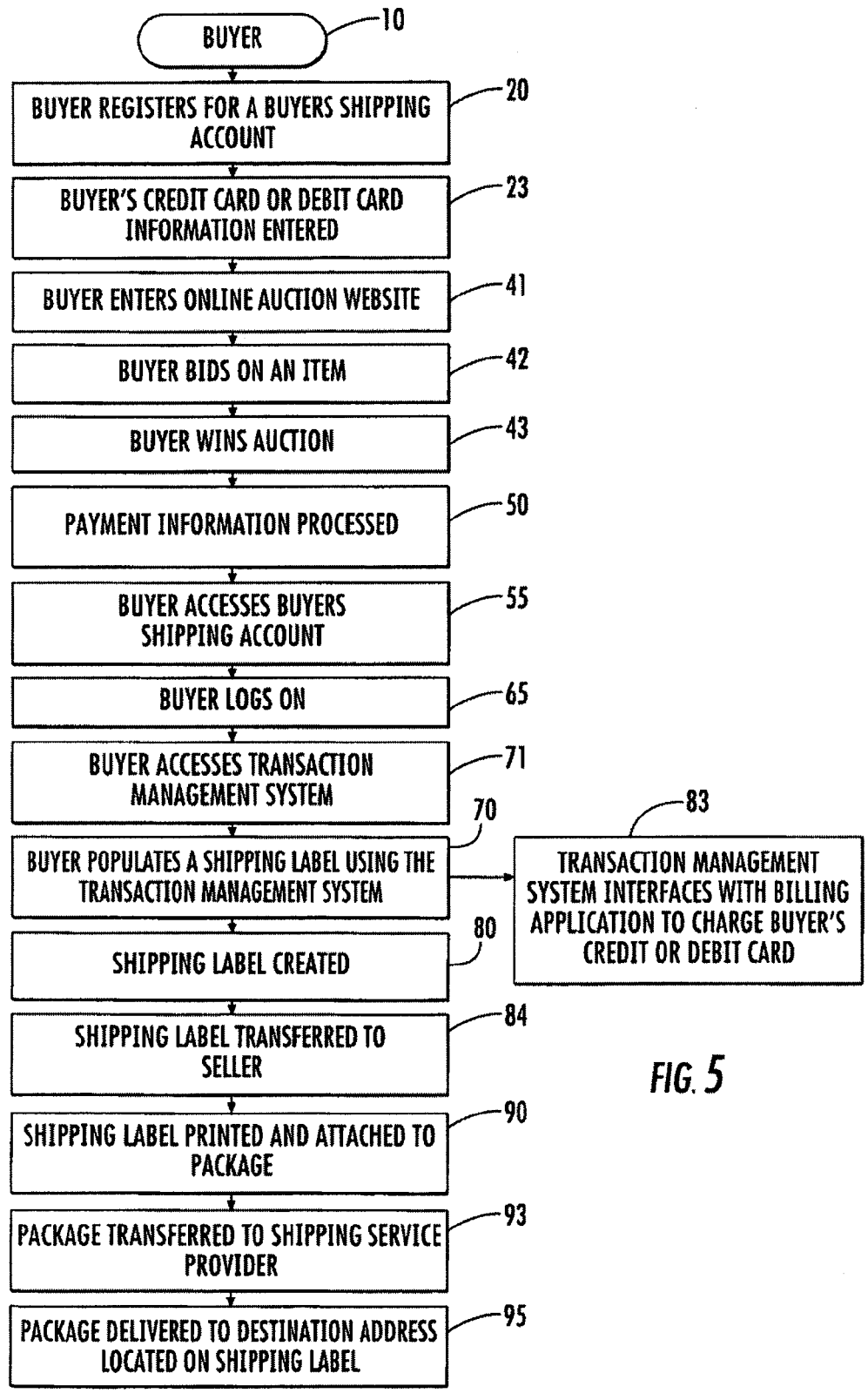
FIG. 5 shows the process flow diagram illustrated in FIG. 2 wherein the buyer pays for shipping services using a credit or debit card, as opposed to a prepaid buying plan.
Figure 6:
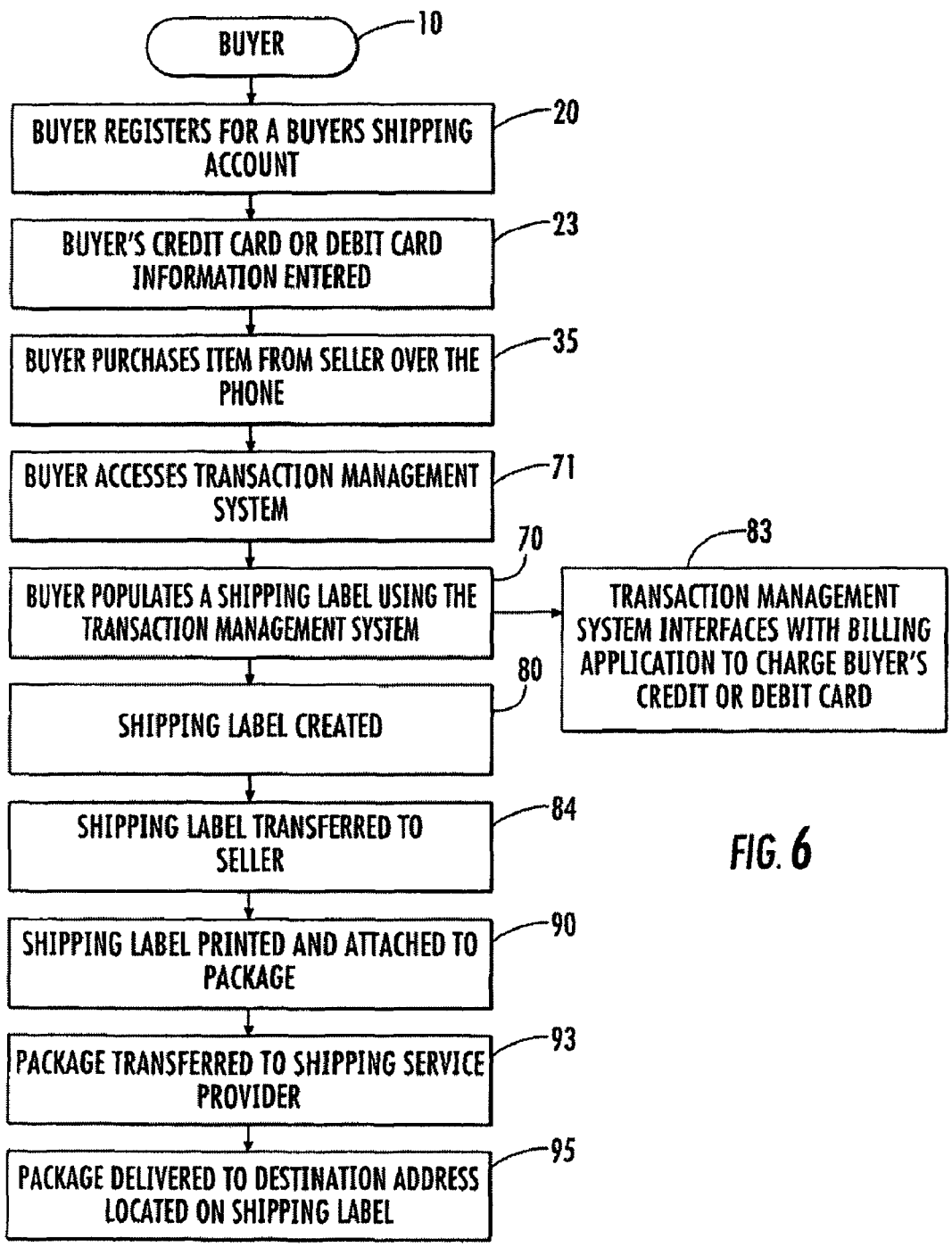
FIG. 6 shows the process flow diagram illustrated in FIG. 3 wherein the buyer pays for shipping services using a credit or debit card, as opposed to a prepaid buying plan.

In an alternative buying plan embodiment, the buyer 10 would not have to prepay for shipping services. In this embodiment, the buyer 10 would register with the SSP and create a buyers shipping account. Instead of purchasing a buying plan, the buyer's account would be set up to allow the buyer to pay for shipping services on a per transaction basis. For example, as shown in FIGS. 4, 5, and 6, the buyers shipping account could store the buyer's credit card or debit card information. When the buyer uses their shipping account to create and purchase a shipping label (described in greater detail below), the buyer's credit or debit card would be used to pay for the shipping fees.

It should be emphasized that the above-described embodiments of the shipping plans, particularly any "preferred embodiments", are merely possible examples, set forth for a clear understanding of the principles of the invention. Any variations and modifications may be made to the above-described embodiments without departing substantially from the spirit of the principles of the invention. All such modifications and variations are intended to be included herein within the scope of the disclosure of the present invention.

Once the buyer 10 has established a buyers shipping account and purchased one or more buying plans, Step 40 shows the buyer selecting merchandise from a retailer's website. After the buyer 10 makes his or her selection, Step 50 illustrates the payment information being processed. In one embodiment, the payment information will be processed through the retailer's website. After paying for the merchandise, the buyer 10 would access their buyers shipping account at Step 60. Instead of letting the retailer make shipping arrangements, the buyer 10 will use their buyers shipping account to create a professional shipping label 25. In one embodiment of the present invention, the buyer 10 will access their account via a link located on the retailer's website, as shown in Step 55. The link will take the user to a LOG IN screen (not shown), executed through the SSP's server. Step 65 shows the buyer 10 logging onto their account by entering a User ID and password. Once logged on, the buyer 10 will access to their personalized transaction management system (Step 71). The transaction management system is described below in greater detail. Step 70 shows the buyer 10 using the transaction management system to populate a shipping label 25 by entering various shipment information such as name, consignee address, consignor address, type of delivery service requested (Overnight, 2nd Day Air, etc.), preferred delivery time, and special handling instructions.

The various shipping label data fields can be populated with shipping information through automated entry procedures, manual entry, or a combination of both. In the preferred embodiment, the buyer 10 would use data previously stored in the transaction management system to automatically populate the shipping label 25. For example, the buyer could select a shipping destination address from a list of stored addresses. Having the shipping label automatically populated will not only increase efficiency, by avoiding the step of manual data entry, but should also reduce the number of user entry errors. Instead of entering information automatically, the buyer 10 could choose to enter the shipment data manually. Under either embodiment, the buyer 10 will always be prompted to verify the accuracy of the shipping information entered at Step 70.

Once the buyer 10 has completed entering data, Step 80 shows the creation of a file containing the shipping label 25. At Step 82, the transaction management system interfaces with a billing application to determine the number of credits that will be used to deliver the purchased merchandise. The billing application uses the information entered at Step 70, such as package size, delivery distance, and shipping service to deduct credits from the buyers shipping account. For example, shipping a ground package might cost the buyer 5 credits whereas an Overnight air shipment might cost 12 credits. In an alternative embodiment, where the buyer 10 has set up their buyers shipping account to pay on a transaction by transaction basis, the billing application will charge the buyer's credit or debit card, as shown in FIG. 4 (Step 83).

At Step 84, the file containing the shipping label 25 gets transferred to the seller. Under this particular embodiment, where the retailer and shipping service provider have an existing business relationship, the file containing the pre-populated shipping label 25 could be transferred directly to the retailer's shipping department. In one embodiment, the shipping label is in PDF format and is transferred to the retailer's shipping department via e-mail. At Step 90, the seller will simply print the shipping label 25 and attach it to the package. Step 93 shows the seller transferring possession of the package to a shipping service provider such as UPS. Finally, Step 95 shows the shipping service provider delivering the package to the destination address populated within the shipping label 25.

Figure 2:
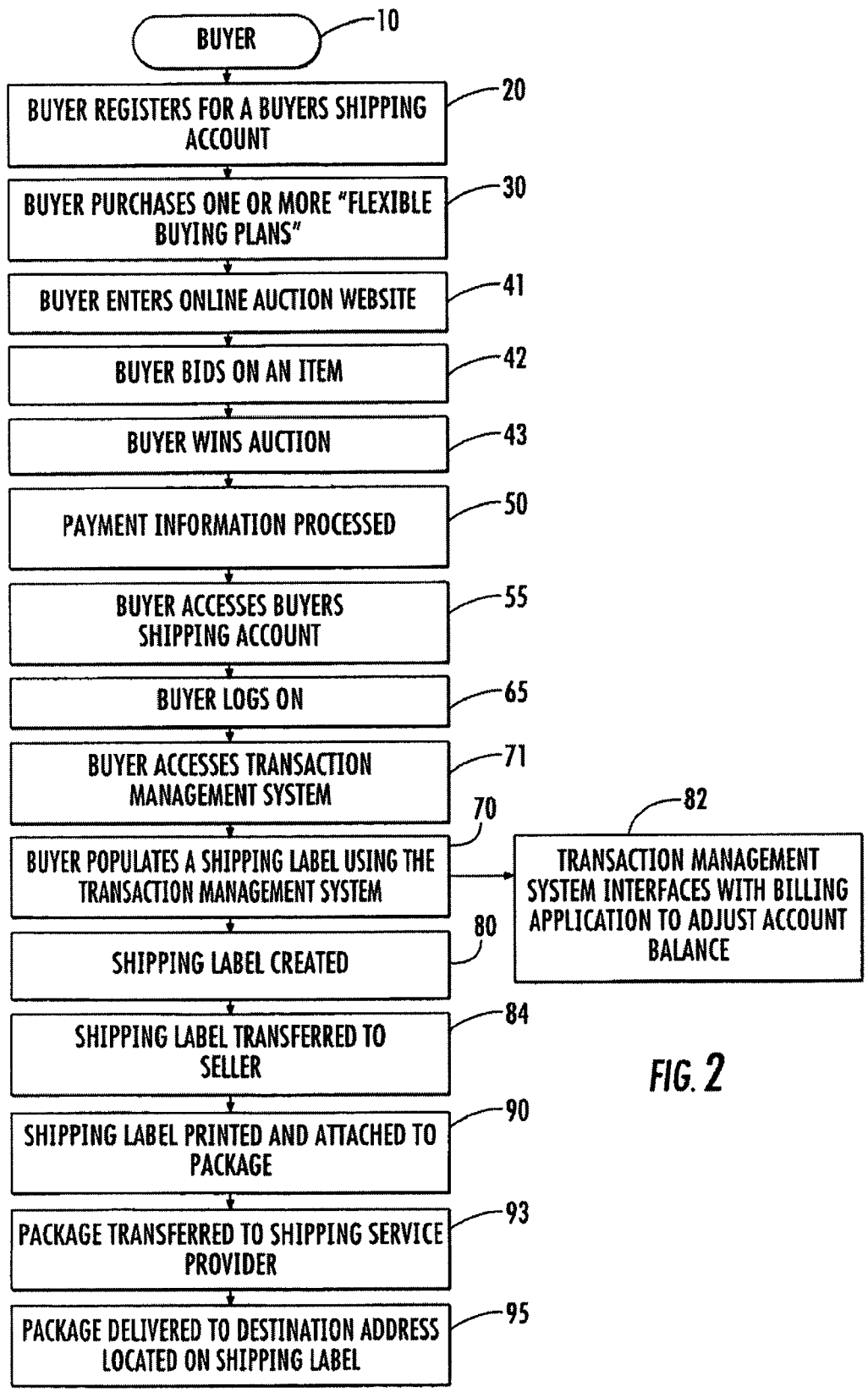
FIG. 2 shows a process flow diagram illustrating the steps in accordance with an embodiment of the present invention in which a buyer purchases an item from another individual through an intermediary such as eBay.

FIG. 2 shows a process flow diagram illustrating the steps in accordance with an embodiment of the present invention in which the transition between the buyer 10 and seller is conducted through an intermediary. In a preferred embodiment, the intermediary is an online auction website such as eBay. In a manner identical to the steps outlined in FIG. 1, the process begins at Step 20, with the buyer 10 setting up a buyers shipping account with a shipping service provider. Once the account is set up, Step 30 shows the buyer 10 purchasing one or more buying plans.

At step 41, the buyer 10 accesses the intermediary's website. Steps 42 and 43 show the buyer 10 bidding on an item and subsequently winning the auction. Following the conclusion of each online auction, the highest bidder (the buyer) is generally required to make payment to the seller. Payment is often done using traditional methods such as checks or money orders. In addition to these traditional forms of payment, many online auction providers are now utilizing PayPal as a means for individuals and businesses to send and receive money online. Using PayPal, buyers can choose to pay using their credit card, debit card, or bank account. PayPal allows buyers to make secure purchases without revealing their credit card number or financial information. In any event, once an auction is complete, the buyer 10 will process payment information at Step 50.

Once the payment has been processed, the buyer accesses their buyers shipping account (Step 55). In a preferred embodiment of Step 55, the buyer 10 will access their buyers shipping account using a link located on the intermediary's webpage. After linking to their buyers shipping account, the buyer 10 will log on (Step 65) by entering a user ID and password. After logging on, the buyer 10 will access their personalized transaction management system, shown at Step 71. From here, the process is identical to that described in FIG. 1, with the buyer entering the appropriate shipping data into the transaction management system. As described above, the data entry can be performed manually or automatically.

Once the buyer 10 has completed entering data at Step 70, the process moves to Steps 80 and 82. At Step 82, the transaction management system interfaces with a billing application to adjust the shipping account balance. At Step 80, a file containing a shipping label 25 is created. At Step 84, the shipping label 25 is transferred to the seller. The means for getting the shipping label 25 to the seller will vary from the embodiment described in FIG. 1, where the seller (Wal-Mart for example) and the shipping service provider have an existing business relationship. When goods are purchased using an online auction website, it might be the first time the seller and buyer have ever done business. Therefore, getting the shipping label 25 to the seller would not be as simple as interfacing with the retailer's shipping department. In one embodiment of Step 84, the seller can access the shipping label 25 via a link located on the intermediary's website. In another embodiment, the seller could receive an e-mail with the shipping label 25 attached. The seller's e-mail address could be provided by the intermediary or it could be entered by the buyer at Step 70. In yet another embodiment of Step 84, the buyer or shipping service provider could physically mail the shipping label 25 to the seller's address. Once the seller receives the pre-populated shipping label 25, Step 90 shows the seller printing the label and attaching it to the package. At Step 93, the package is transferred to a shipping service provider. Finally, at Step 95, the shipping service provider delivers the package to the destination address populated on the shipping label 25.

Figure 3:
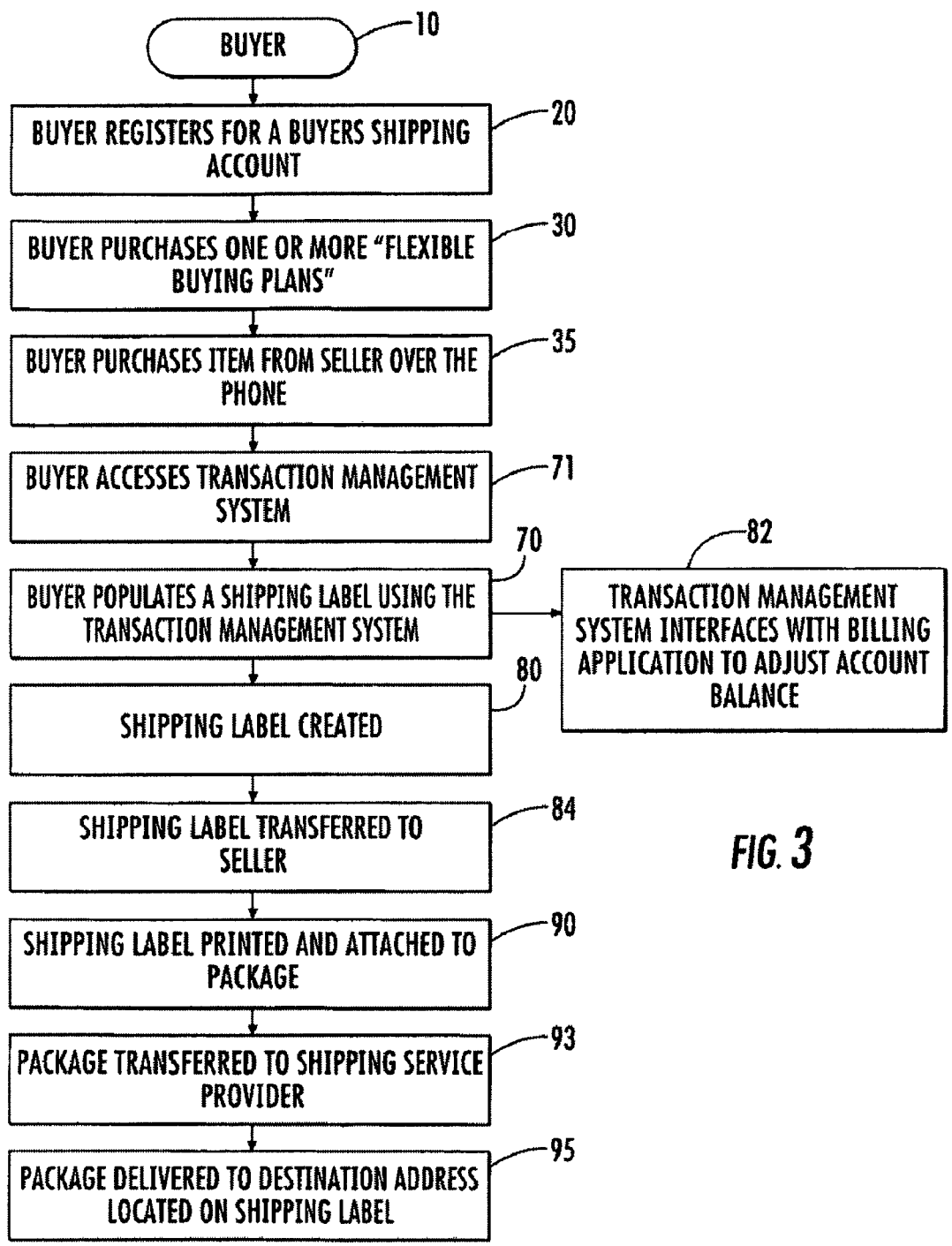
FIG. 3 shows a process flow diagram illustrating the steps in accordance with an embodiment of the present invention in which a buyer purchases an item directly from a seller such as over the phone or face-to-face.

FIG. 3 shows a process flow diagram illustrating the steps in accordance with an embodiment of the present invention in which a buyer 10 purchases an item from a seller over the phone or face-to-face. In a manner identical to the steps outlined in FIGS. 1 and 2, the process begins at Step 20, with the buyer 10 setting up a buyers shipping account with a shipping service provider such as UPS. Step 30 shows the buyer purchasing one or more flexible buying plans. At Step 35, the buyer purchases an item from the seller. Instead of letting the seller make delivery arrangements, the buyer accesses their buying account's transaction management system, at Step 71, and creates a shipping label 25 in the same manner previously described in FIGS. 1 and 2. At Step 80, the shipping data entered at Step 70 gets populated onto a shipping label 25. At Step 84, the shipping label is transferred to the seller. In one embodiment, the shipping label 25 can be physically mailed to the seller. In another embodiment, the shipping label 25 can be sent via e-mail. When transferred using e-mail, the shipping label 25 will be attached as a PDF file or any other suitable file format. At Step 82, the transaction management system interfaces with a billing application to adjust the buyer's account balance. At Step 90, the seller, now in possession of the shipping label 25, attaches the label to the package. At Step 93, the seller transfers the package to a shipping service provider. Finally, at Step 95, the shipping service provider delivers the package to the destination address populated on the shipping label 25.

FIGS. 4, 5, and 6 show similar process flow diagrams as those described above in FIGS. 1, 2, and 3. However, FIGS. 4, 5, and 6 illustrate embodiments in which the buyer purchases shipping services using a credit or debit card. Unlike FIGS. 1, 2, and 3, where the buyer prepays for one or more buying plans, the buyer, at step 23, will enter their credit or debit card information into their buyers shipping account profile. As shown in step 83, the transaction management system interfaces with a billing application to charge the buyer's credit or debit card once a shipping label 25 has been populated and created at steps 70 and 80.

Figure 7:
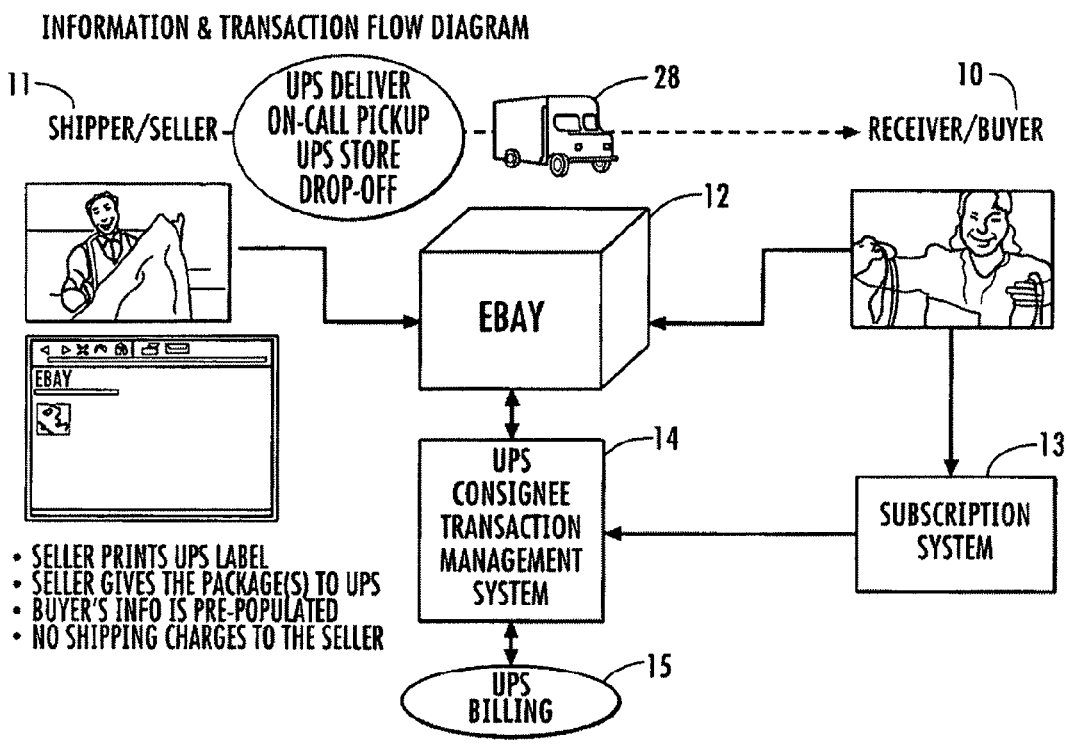
FIG. 7 is an overview of the embodiment of the Buyer-Initiated Shipping System in which a buyer purchases an item from an individual using an online auctioneer such as eBay.

FIG. 7 is an overview of the embodiment of the Buyer-Initiated Shipping System in which a buyer purchases an item from an individual using an intermediary such as eBay. In this embodiment, the buyer 10 and the seller 11, conduct a transaction using an intermediary 12 such as eBay. At some point in time, preferably prior to the auction, the buyer 10 will use a subscription system 13 to set up a buyers shipping account with a shipping service provider such as UPS. The subscription system is linked to the SSP's website and encompasses the execution of the REGISTRATION routine 158, described in greater detail in FIGS. 9A and 9B. As can be seen, the subscription system 13 will interface with a transaction management system 14. As will be shown in greater detail below, the transaction management system 14 performs various functions relating to managing the buyers shipping account and is also configured to interface between a billing application 15 and the intermediary's website 12. The billing application 15 communicates with the transaction management system to determine the number of credits used in connection with each transaction, updates the credit balance within the transaction management system, and processes payment information when the buyer purchases a new shipping plan or recharges their current plan.

Once an auction is over, the buyer 10 will purchase the item and arrange for shipping by accessing the transaction management system, accessible via a link or window located on the intermediary's website. Using the transaction management system, the buyer will create a shipping label 25 and transfer the label to the seller. The entire shipping transaction will be hidden from the seller. The seller's only role will be to access the shipping label, print it out, attach it to the package, and transfer it to the shipping service provider. As described above, transferring the package can be accomplished by either dropping off the package at a designed pickup point, giving the package to a SSP representative, or by having the package picked up at the seller's location.

Step 70—Populating a Shipping Label

As described above, in one embodiment of the present invention, the buyer 10 uses the transaction management system to populate a shipping label 25 by entering various shipment information such as name, consignee address, consignor address, type of delivery service requested (Overnight, 2nd Day Air, etc.), preferred delivery time, and special handling instructions. Such data entry can occur through automated entry procedures, manual entry, or a combination of both.

In another embodiment of the present invention, the data used to populate the shipping label comes from both the buyer and the seller. For example, when the seller is a retailer and the transaction is conducted through the retailer's website, the retailer could provide a first set of data. This first set of data could include data such as estimated package weight, special handling instructions (e.g., "fragile" or "handle with care"), and shipper/consignor address information. The data included within this first set will generally include information within the seller's knowledge. For example, because the seller is in possession of the items, they will be better suited to provide weight data. Likewise, the seller is in a better position to provide an accurate consignor address.

In one embodiment, the first set of data could be provided following a "checkout" routine performed on the retailer's website. In a typical Internet purchase, the buyer selects one or more items, places the selected items in a "cart," and proceeds to a virtual "checkout." During the checkout routine, the items within the buyer's cart are tallied and purchased, typically through use of a credit or debit card. In addition to keeping track of each item's price, the retailer could also keep track of each items approximate shipping weight. Once the items within the cart are purchased, the weights from each item could be added together to provide an estimated total shipping weight. When the buyer accesses their buyers shipping account at step 55, the estimated shipping weight could be transmitted to the transaction management system and populated within a shipping label. Likewise, data such as consignor address and special handling instructions could also be transferred to the transaction managements system and populated onto the shipping label.

Once the transaction management system has been accessed, the buyer could enter a second set of data. This second set of data would generally include information within the buyer's knowledge, such as name, consignee address, type of delivery service requested (Overnight, 2nd Day Air, etc.), and preferred delivery time. Between the first and second data sets, a complete and accurate shipping label 25 would be created. A similar process could occur when the transaction is conducted through an intermediary such as eBay. When the buyer accesses the transaction management system from the intermediary's website, a first set of data including weight and consignor address could be automatically transmitted and populated onto a shipping label. As described above, the buyer would finish populating the shipping label by entering a second set of data.

Step 93—Transferring the Package to the Shipping Service Provider

By way of illustration and not limitation, a package is typically tendered to or acquired by the shipping service provider (SSP) by way of one of three methods. The package sender, i.e., the individual seller described in FIGS. 2 and 3, or the retailer in the embodiment disclosed in FIG. 1, may (1) tender the package to a SSP representative who accepts the package during the normal course of delivery rounds, (2) tender the package to the location of their choice, or (3) the package sender may send an order requesting the SSP dispatch a representative to the package sender's location at a specified date within a specified time period to pick up the package.

In the case of a request for package pickup, the order is relayed to an On-Demand System (ODS). The ODS which is in communication with an ODS database, is operated to search, identify and dispatch a pickup vehicle (FIG. 7, 28) to acquire the package. In a preferred embodiment, the pickup vehicle is a driver and package car or truck. It will be noted that the location of the parcel and the location of the sender may be different. In a preferred embodiment the package sender will direct the SSP to the location of the package. Upon acquiring the package, the driver employs a delivery information acquisition device (DIAD) to capture data located on the label 25 regarding the package, package sender, and recipient as necessary to facilitate the delivery.

Transaction Management System

As described above, the buyer 10 will be using the transaction management system to create shipping labels 25. However, the transaction management system will also allow the buyer 10 to access additional services offered by the shipping service provider. For example, the exemplary embodiment of the present invention shows a transaction management system which allows access to various UPS visibility services such as Quantum View Data-Inbound, Quantum View Data-Outbound, Quantum View Notify, Quantum View Manage, and UPS Signature Tracking Using the transaction management system, the buyer can also manage their buying account using features such as an address book and a profile manager. The address book will be capable of holding multiple shipping addresses while the profile manager will store the buyer's personal information.

The transaction management system will also provide account balances and tracking information for both received and outstanding shipments. The buyer can also use the transaction management system to recharge or upgrade shipping plans.

Shipping Label 25

Figure 8:
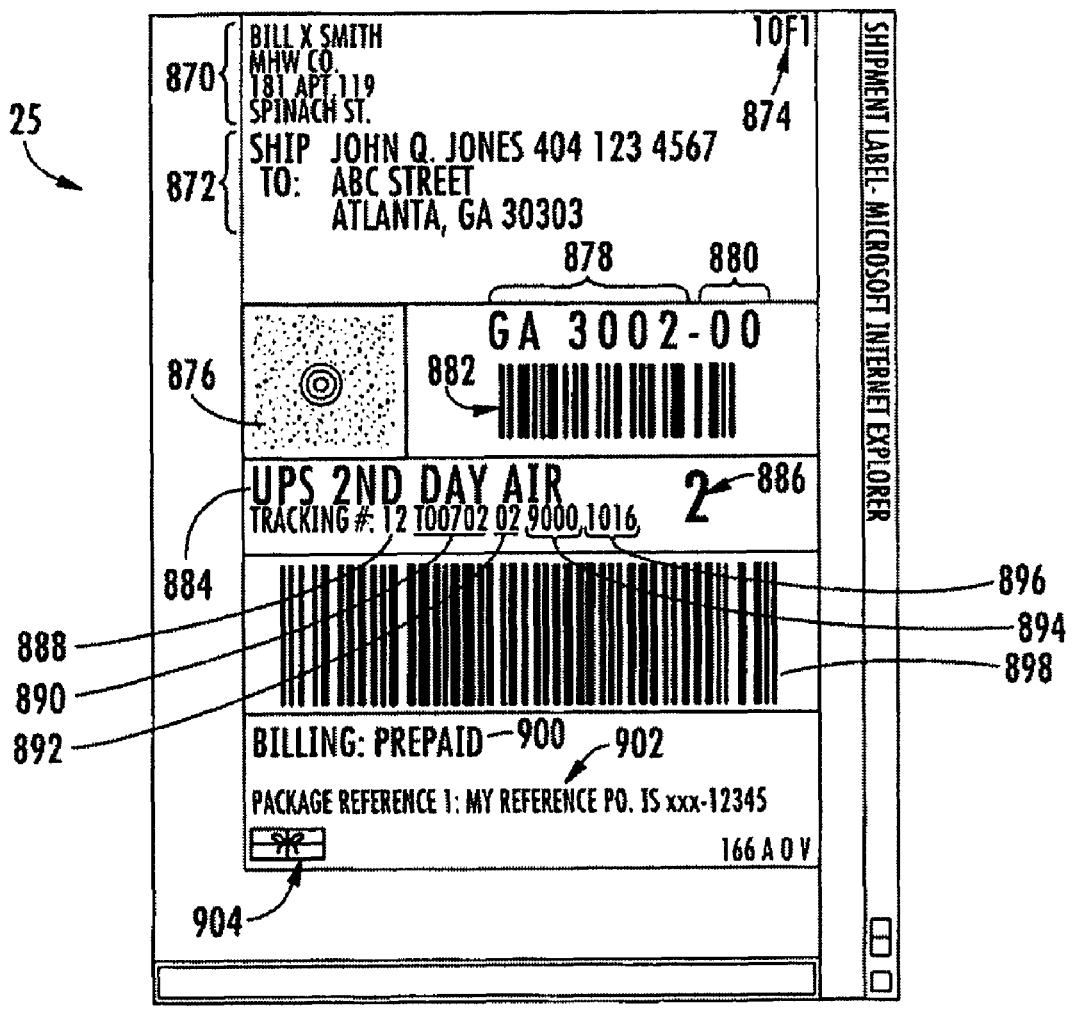
FIG. 8 is an exemplary shipping label, as generated by a preferred embodiment of the present invention.

Turn now to FIG. 8 for a discussion of features of the disclosed shipping label 25. A shipping label 25 generated in accordance with a preferred embodiment of the present invention contains a number of information containing regions, some machine readable via bar code and/or Maxicode®, some human readable, and some security indicia. Information contained in the label is laid out to maximize use of space as well as machine readability. A Return Address region 870 appears in the upper left hand corner.

Below the Return Address region appears a Ship To address region 872 and in the upper right hand corner appears a Package Count region 874 indicating how many packages are in the present shipment and the number of the present package within that shipment.

Below the Ship To address is a square block containing a Maxicode® symbol 876. A Maxicode® is a proprietary machine-readable dense code containing all the text of the label and optionally other package level detail (PLD) information concerning the customer, the contents, special handling, etc. Those skilled in the art will understand that at least one hundred characters of text can be stored in a Maxicode® and machine-read with a scanner.

To the right of the Maxicode® is a human readable Sort Code region 882, which identifies an Initial Sorting Hub 878 and a Sorting Belt Code 880 which identifies the sorting belt within the hub 42 to which the package is first routed.

A Final Destination postal code appears below the human readable codes 878, 880 in the form of a Code 128 or other popular barcode 882. The postal code may be reproduced in human readable form (not shown) if desired.

A horizontal box below the codes just described contains text 884 describing the level of the service and a large font alphanumeric Level of Service code 886. Immediately below is a 1Z code 888 which serves as a tracking number. The IZ code itself comprises an alphanumeric 6-digit Customer Account Number 890, a Level of Service identifier 892, a non-sequential Reference Numeral 894, and a Check Sum digit 896.

The Customer Account Number 890 may contain a special character to designate a specific type of payment, for example, payment via the UPS flexible buying account, or payment using a credit card account. Here for example, the letter "T" designates a credit card account. The tracking number may be encoded in a machine-readable barcode region 898. A unique 1Z number is generated for each label printed, for security purposes, as discussed.

In the lowermost section of the label, a billing identifier 900 states the type of billing. As shown, the "BILLING: PREPAID" identifier signals to the carrier's personnel to accept the package because payment has been validated. Also, in this section are one or more lines of User Text 902 that may be used to identify the customer's reference for customer internal accounting, filing, or the like.

In the lower left of the label block is a Logo region. According to one aspect of the invention, personnel of the shipping service provider may be instructed not to accept this type of label unless the Logo 904 and indicia indicative of payment such as the BILLING: PREPAID identifier 900 are both present. This combination of identifiers helps to detect fraudulent use of copies of shipping labels. It will therefore be appreciated that the various features of the label, working in combination, are security measures against fraudulent reuse of a label, or of copying of a label, or of printing multiple copies of a label.

The labels may be printed sideways within half of a standard 8½"×11" page which can then be folded and inserted into a transparent envelope attached to a package, or attached directly to the package. Finally, an additional routing and instruction section on the label 25 (not shown) may provide for special instructions. This may include a required signature, earliest delivery times, verbal confirmation of delivery, COD, hazardous material, international billing options. Within the international billing options, the routing instructions sections may specify split billing, third-party billing, domestic U.S. billing options, etc.

As will be understood by those skilled in the art, the shipping label 25 is not limited to the format described above. The information included in the format described above may be rearranged, deleted, or added to create labels of different configurations. For example, the Shipped From block, Package Information block, Shipped To block, and Customer block may be arranged to the left of the label, while the Maxicode® block, Postal Barcode block, Tracking Number Barcode block and Routing Instructions block may be grouped to the right hand side. Again, these may be rearranged to suit the needs of the user or the shipping service provider.

Registration Routine

Turn now to FIG. 9A for a discussion of a routine 158 of a preferred embodiment for member registration. Registration is the process that each non-registered user initiates to establish a buyers shipping account.

In response to invoking the REGISTRATION routine 158, the system displays a REGISTRATION screen or page (not shown) at step 210. Although not shown in the figures, the REGISTRATION screen prompts the registering user to respond to certain queries by providing information such as, but not limited to, the user's name, their title and company name if applicable, their address including city, state/province and postal code, and the country of origin. Further, the registering user provides telephone numbers and e-mail address. It will be understood that such information may be input through a data entry device in communication with the computer or selected from pull-down screens.

After the registering user provides the information requested, at step 212 they verify that all required fields are correctly filled-in. At decision step 214, the registering user can decide whether to view a privacy policy (or other agreements) by selecting an AGREEMENTS button (not shown) at step 216. In response, the system will display the information about the user agreement and privacy policy for the registering user to view.

At decision step 218, the registering user can decide whether to cancel or proceed with registration. If at decision 218 the user decides to cancel out of registration, they select the CANCEL button (not shown) at step 220. In response, the user will be returned to the SSP's homepage.

If at decision 218 the user chooses to continue the registration process, the user selects a REGISTER button (not shown) at step 226 to access a REGISTRATION/MEMBER INFORMATION screen (not shown), and the process branches to routine 228 to establish a member ID and password, and receive the user's acceptance of registration. At step 230, the system displays a REGISTRATION/MEMBER INFORMATION screen (not shown). Although not shown, the REGISTRATION/MEMBER INFORMATION screen initially prompts a user to enter an ID and a password, to reenter the password, to select a verification question from a drop-down list, and finally to enter a verification response.

After registration is complete and when the user returns to conduct a transaction, the user can access their buyers shipping account by simply entering their member ID and password on a LOG IN screen (not shown), accessible through the shipping service provider's homepage.

Still referring to FIG. 9A at step 232 the user decides whether to accept the provided information for registration. If the user decides to reject any of the input information, or declines to register, the user selects a REJECT button (not shown) on the screen at step 234. In response, the user is returned to the SSP's homepage. If the registering user chooses to continue the registration process, the user activates an ACCEPT button (not shown) on the screen at step 236. In response, the system displays a REGISTRATION/THANKYOU screen (not illustrated) at step 238.

Although not shown, the REGISTRATION/THANKYOU screen includes a LOG IN button which the user may select at step 240 in order to login to their buyers shipping account. Upon completion of the registration process described in connection with FIG. 9B, the registered user will have established a buyers shipping account. It is important to note that the preferred registration routine described above is one embodiment of a registration method. Other registration methods may be used.

Although the present invention has been disclosed and described in terms of preferred embodiments, it is not intended that the invention be limited to such embodiments. Modifications within the spirit of the invention will be apparent to those skilled in the art. The scope of the present invention is to be limited only by the claims which follow.

What is claimed is:

1. A system by which a buyer can create and purchase a shipping label from a shipping service provider for use by a seller in connection with delivery of goods purchased over the Internet from the seller, said system comprising:
   at least one computer processor;
   at least one memory coupled to the processor, said at least one memory storing a computer program executable by the processor to:
   receive registration information from the buyer, the registration information comprising data specifying registration of the buyer for a shipping account with the shipping service provider;
   create the shipping account in which the buyer can arrange for direct payment of shipping services with the shipping service provider;
   receive shipping information from the buyer accessing the shipping account and entering the shipping information, the shipping information being associated with a transaction with the seller and comprising information to facilitate, at least in part, shipment of the goods from the seller to the buyer;
   create a file containing a pre-populated shipping label, the pre-populated shipping label comprising the buyer's physical delivery address in a human readable format; and
   transfer the file to the seller such that the seller can use the pre-populated shipping label to facilitate shipment of the goods to the buyer via the shipping service provider.

2. The system of claim 1, wherein the at least one computer processor transfers the file containing the shipping label to the seller by an electronic mail message.

3. The system of claim 1, wherein the at least one computer processor transfers the file containing the shipping label is transferred to the seller via a link displayed on a website and the seller uses the link to access the shipping label.

4. The system of claim 1, wherein the shipping account further comprises preferred delivery time-window information, destination address, and type of shipping service requested.

5. The system of claim 1, wherein the shipping account comprises one or more buying plans to facilitate a purchase of the shipping label.

6. The system of claim 5, wherein the one or more buying plans comprise prepaid shipping credits.

7. The system of claim 6, wherein the one or more buying plans provide for rollover on any unused shipping credits of the prepaid shipping credits from month to month.

8. The system of claim 5, wherein the one or more buying plans comprise unlimited monthly shipping in exchange for a fixed fee.

9. The system of claim 5, wherein the one or more buying plans provides a fixed number of monthly shipping credits in exchange for a fixed fee.

10. The system of claim 5, wherein the at least one computer processor is configured to determine the cost of the shipping label and to update the shipping account to facilitate the purchase of the shipping label.

11. A computer-implemented method by which a buyer can create and purchase a shipping label from a shipping service provider for use by a seller in connection with delivery of goods purchased over the Internet from the seller, the method comprising the steps of:
    receiving registration information from the buyer, the registration information comprising data specifying registration of the buyer for a shipping account with the shipping service provider;
    creating, by a computer program executed by at least one processor of at least one computing device, the shipping account in which the buyer can arrange for direct payment of shipping services with the shipping service provider by at least one computer processor;
    receiving shipping information from the buyer accessing the shipping account and entering the shipping information, the shipping information being associated with a transaction with the seller and comprising information to facilitate, at least in part, shipment of the goods from the seller to the buyer;
    creating, by the computer program, a file containing a pre-populated shipping label by the at least one computer processor, the pre-populated shipping label comprising the buyer's physical delivery address in a human readable format; and
    transferring, by the computer program, the file to the seller such that the seller can use the pre-populated shipping label to facilitate shipment of the goods to the buyer via the shipping service provider.

12. The method of claim 11, wherein the step of transferring the file containing the shipping label to the seller is performed by sending an electronic mail message.

13. The method of claim 11, wherein the step of transferring the file containing the shipping label to the seller is performed by displaying a link on a website and the seller uses the link to access the shipping label.

14. The method of claim 11, wherein the shipping account further comprises preferred delivery time-window information, destination address, and type of shipping service requested.

15. The method of claim 11, wherein the shipping account comprises one or more buying plans to facilitate a purchase of the shipping label.

16. The method of claim 15, wherein the one or more buying plans comprise prepaid shipping credits.

17. The method of claim 16, wherein the one or more buying plans provide for rollover on any unused shipping credits of the prepaid shipping credits from month to month.

18. The method of claim 15, wherein the one or more buying plans comprise unlimited monthly shipping in exchange for a fixed fee.

19. The method of claim 15, wherein the one or more buying plans provides a fixed number of monthly shipping credits in exchange for a fixed fee.

20. The method of claim 15, wherein the at least one computer processor is configured to determine the cost of the shipping label and to update the shipping account to facilitate the purchase of the shipping label.

21. A system by which a buyer can create and purchase a shipping label from a shipping service provider for use by a seller in connection with delivery of goods purchased over the Internet from the seller, said system comprising:
    at least one computer processor;
    at least one memory coupled to the processor, said at least one memory storing a computer program executable by the processor to:
        receive registration information from the buyer, the registration information comprising data specifying registration of the buyer for a shipping account with the shipping service provider;
        create the shipping account in which the buyer can arrange for direct payment of shipping services with the shipping service provider, the shipping account comprising one or more buying plans to facilitate a purchase of a pre-populated shipping label;
        receive shipping information from the buyer accessing the shipping account and entering the shipping information, the shipping information being associated with a transaction with the seller and comprising information to facilitate, at least in part, shipment of the goods from the seller to the buyer;
        create a file containing the pre-populated shipping label, the pre-populated shipping label comprising the buyer's physical delivery address; and
        transfer the file to the seller such that the seller can use the pre-populated shipping label to facilitate shipment of the goods to the buyer via the shipping service provider.

22. A computer-implemented method by which a buyer can create and purchase a shipping label from a shipping service provider for use by a seller in connection with delivery of goods purchased over the Internet from the seller, the method comprising the steps of:
    receiving registration information from the buyer, the registration information comprising data specifying registration of the buyer for a shipping account with the shipping service provider;
    creating, by a computer program executed by at least one processor of at least one computing device, the shipping account in which the buyer can arrange for direct payment of shipping services with the shipping service provider by at least one computer processor, the shipping account comprising one or more buying plans to facilitate a purchase of a pre-populated shipping label;
    receiving shipping information from the buyer accessing the shipping account and entering the shipping information, the shipping information being associated with a transaction with the seller and comprising information to facilitate, at least in part, shipment of the goods from the seller to the buyer;
    creating, by the computer program, a file containing a pre-populated shipping label by the at least one computer processor, the pre-populated shipping label comprising the buyer's physical delivery address; and
    transferring, by the computer program, the file to the seller such that the seller can use the pre-populated shipping label to facilitate shipment of the goods to the buyer via the shipping service provider.

* * * * *